G. L. SCHROEDER.
PLOW SLIDE.
APPLICATION FILED AUG. 27, 1909.
956,187. Patented Apr. 26, 1910.
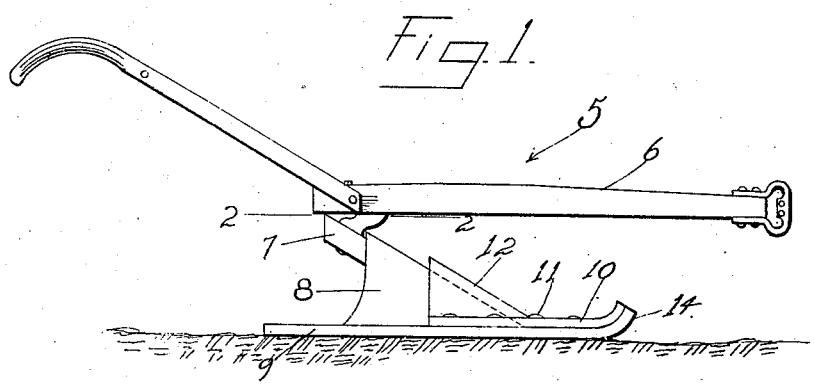
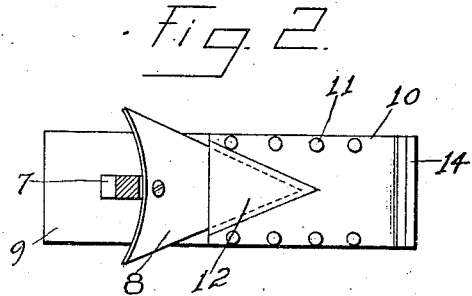
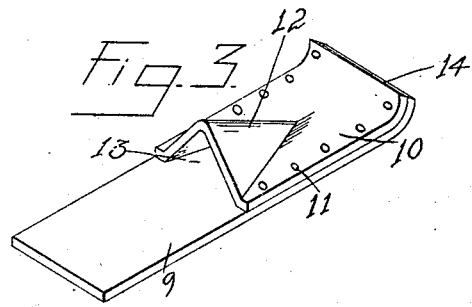
Witnesses
J. E. Strobel.
Inventor
GEORGE L. SCHROEDER
By Chandler & Chandler
Attorneys

UNITED STATES PATENT OFFICE.

GEORGE L. SCHROEDER, OF ROCKDALE, TEXAS.

PLOW-SLIDE.

956,187.  Specification of Letters Patent.  Patented Apr. 26, 1910.

Application filed August 27, 1909. Serial No. 514,939.

*To all whom it may concern:*

Be it known that I, GEORGE L. SCHROEDER, a citizen of the United States, residing at Rockdale, in the county of Milam, State of Texas, have invented certain new and useful Improvements in Plow-Slides; and I do hereby declare the following to be a full, clear, and exact description of the invention, such as will enable others skilled in the art to which it appertains to make and use the same.

The invention relates to a plow slide and more particularly to the class of plow protectors.

The primary object of the invention is the provision of a plow slide in which plows of varying types may be readily and easily transported or removed from field to field or other localities.

Another object of the invention is the provision of a plow slide in which a plow may be conveniently moved from place to place without any chance of injury to its blade by way of dulling, wearing, or breaking the same.

A further object of the invention is the provision of a plow slide which is simple in construction, thoroughly reliable and efficient in operation, and inexpensive in the manufacture.

With these and other objects in view, the invention consists in the construction, combination and arrangement of parts, as will be hereinafter more fully described, illustrated in the accompanying drawings, which disclose the preferred form of embodiment of the invention, to enable those skilled in the art to practice the same and as pointed out in the claim hereunto appended.

In the drawings:—Figure 1 is a side elevation of a plow mounted upon the device constructed in accordance with the invention. Fig. 2 is a sectional view on the line 2—2 of Fig. 1. Fig. 3 is a detail perspective view of the device with the plow removed therefrom.

Similar reference characters indicate corresponding parts throughout the several views in the drawings.

Referring to the drawings by numerals, 5 designates generally a plow which is of the ordinary or well known construction, having a main beam 6, near the rear end of which is mounted a depending forwardly inclined standard 7, to which latter is connected the plow blade or share 8, in the usual manner.

The plow slide comprises a rectangular-shaped metallic plate 9, forming a runner, the same may be of any desirable length width and thickness, having mounted upon its forward end portion a superimposed reinforcing plate 10, the latter being secured near its opposite longitudinal edges to the plate 9, by means of fasteners 11, and this reinforcing plate is bent to form a tapering inverted V-shaped swell 12, rising therefrom and extending from its rear edge to a central point forwardly thereof, so as to form a pocket 13, to receive the blade 8, of the plow 5, when positioned upon the runner 9, so that the plow may be transported from one locality to another or may be removed from field to field as the occasion demands.

The forward end of the slide is upwardly curved as at 14, so as to permit or insure the free movement or sliding of the plow slide over uneven ground and in this manner it will not be impeded by obstructions when traveling over the ground.

It is clearly obvious that the plow slide is adapted for supporting various types of plows for transportation. Furthermore it is apparent that due to the swell 12, in the reinforcing plate 10, of the slide, the blade or share of a plow is fully protected against wear and breakage, and that due to the shape of the swell the earth passing onto the slide will be deflected or dispersed to opposite sides of the slide when in use.

What is claimed is:—

A device of the class described comprising a flat elongated plate of uniform width throughout its length having a forward upwardly curved extremity, and a reinforcing plate superimposed and secured to the forward portion of the first named plate and having an upwardly bulged portion of substantially inverted V-shape to provide a pocket in its rear end for receiving a plow blade whereby the point of the latter is entirely concealed.

In testimony whereof, I affix my signature, in presence of two witnesses.

GEO. L. SCHROEDER.

Witnesses:
 HERRON HEIDER,
 E. P. HENKE.